US012670418B2

(12) United States Patent
Lan et al.

(10) Patent No.: US 12,670,418 B2
(45) Date of Patent: Jun. 30, 2026

(54) SYSTEMS AND METHODS FOR END-TO-END MULTI-AGENT REINFORCEMENT LEARNING ON A GRAPHICS PROCESSING UNIT

(71) Applicant: Salesforce, Inc., San Francisco, CA (US)

(72) Inventors: Tian Lan, Pleasanton, CA (US); Stephan Tao Zheng, San Francisco, CA (US); Sunil Srinivasa, Palo Alto, CA (US)

(73) Assignee: Salesforce, Inc., San Francisco, CA (US)

( * ) Notice: Subject to any disclaimer, the term of this patent is extended or adjusted under 35 U.S.C. 154(b) by 980 days.

(21) Appl. No.: 17/581,782

(22) Filed: Jan. 21, 2022

(65) Prior Publication Data

US 2023/0237352 A1    Jul. 27, 2023

(51) Int. Cl.
*G06N 5/043* (2023.01)
*G06N 3/092* (2023.01)
*G06N 20/00* (2019.01)

(52) U.S. Cl.
CPC ............. *G06N 5/043* (2013.01); *G06N 3/092* (2023.01); *G06N 20/00* (2019.01)

(58) Field of Classification Search
CPC ........ G06N 5/043; G06N 20/00; G06N 3/006; G06N 3/045; G06N 3/08; G06N 3/092; G06F 9/5072; G06F 9/545
See application file for complete search history.

(56) References Cited

U.S. PATENT DOCUMENTS

| | | | |
|---|---|---|---|
| 11,080,111 B1 * | 8/2021 | Perelygin | G06F 9/544 |
| 2017/0322845 A1 * | 11/2017 | Nomura | G06F 3/0689 |
| 2022/0398283 A1 * | 12/2022 | Mannor | G06N 3/006 |
| 2023/0039180 A1 * | 2/2023 | Luitjens | G06F 9/3555 |

OTHER PUBLICATIONS

Liang et al. (GPU-Accelerated Robotic Simulation for Distributed Reinforcement Learning, 2nd Conference on Robot Learning (CoRL 2018), pp. 1-13). (Year: 2018).*
Dalton et al. (Accelerating Reinforcement Learning through GPU Atari Emulation, arXiv:1907.08467, published 2020, pp. 1-13). (Year: 2020).*

* cited by examiner

*Primary Examiner* — Tan H Tran
(74) *Attorney, Agent, or Firm* — Haynes and Boone, LLP

(57) ABSTRACT

Embodiments provide a fast multi-agent reinforcement learning (RL) pipeline that runs the full RL workflow end-to-end on a single GPU, using a single store of data for simulation roll-outs, inference, and training. Specifically, simulations and agents in each simulation are run in tandem, taking advantage of the parallel capabilities of the GPU. This way, the costly GPU-CPU communication and copying is significantly reduced, and simulation sampling and learning rates are in turn improved. In this way, a large number of simulations may be concurrently run on the GPU, thus largely improving efficiency of the RL training.

20 Claims, 13 Drawing Sheets

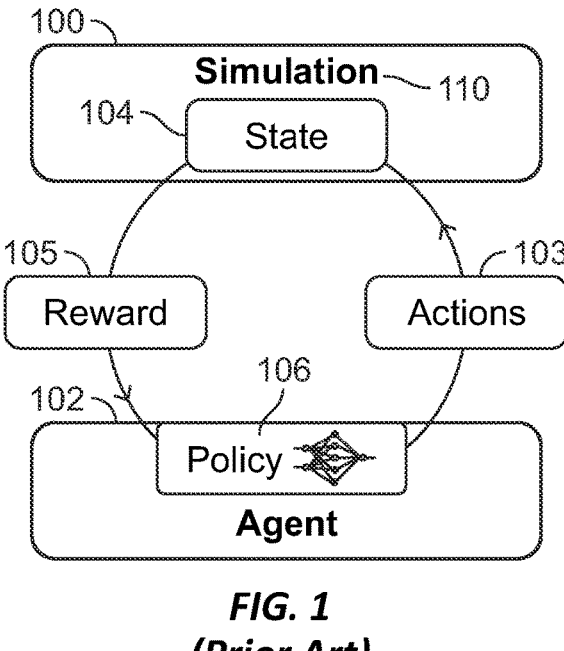
FIG. 1
(Prior Art)
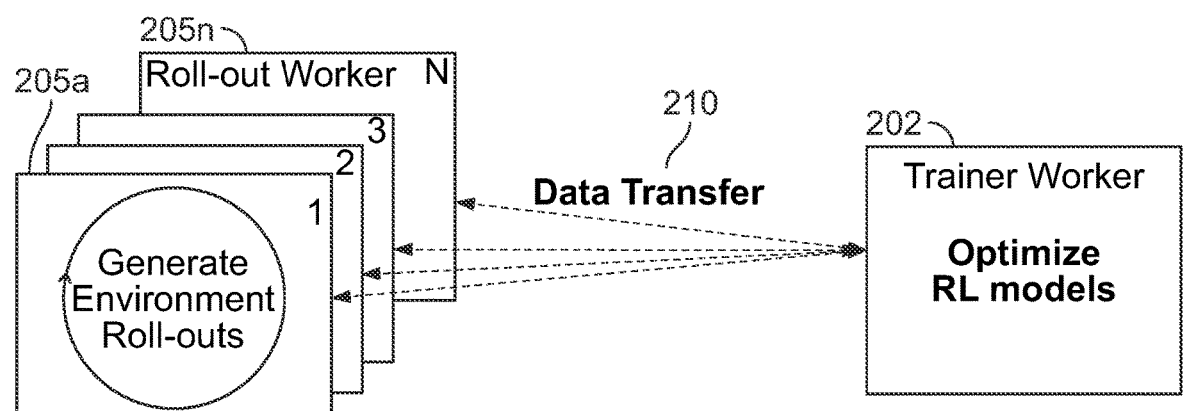
FIG. 2
(Prior Art)

500

```
__global__ void cuda_step(
    ...,  // pointer arguments
    float * obs,
    int * actions,
    float * rew,
    int* done
) {
    // Agent and environment indices
    // corresponding to this GPU thread.
    const int kAgentIdx = threadIdx.x;
    const int kEnvIdx = blockIdx.x;
    // Update just the array indices
    // for `kAgentIdx` and `kEnvIdx`.
    ...;
    // returns nothing.
}
```

```
class Env:
    def __init__(self, **env_config):
        ...

def reset(self):
        ...
        return obs def get_data_dictionary(self):
        # Specify the data that needs to be
        # pushed to the GPU.
        data_feed = DataFeed()
        data_feed.add_data(
            name="variable_name",
            data=self.variable,
            save_copy_and_apply_at_reset
            =True,
        )
        ...
        return data_feed def step(self, actions):
        if self.use_cuda:
            self.cuda_step(
                # Pass the relevant data
                # feed keys as arguments
                # to cuda_step.
                # Note: cuda_data_manager
                # is created by the
                # EnvWrapper.
                self.cuda_data_manager.
                device_data(...),
                ...
            )
        else:
            ...
            return obs, rew, done, info
```

```
# Create a wrapped environment object via
# the EnvWrapper.
# Ensure that use_cuda is set to True in
# order to run on the GPU.
env_wrapper = EnvWrapper(
    Env(**env_config),
    num_envs=2000,
    use_cuda=True
)
# Agents can share policy models: this
# dictionary maps policy model names to
# agent ids.
policy_tag_to_agent_id_map = {
    <policy_tag>: [agent_ids]
}
# Create the trainer object.
trainer = Trainer(
    env_wrapper=env_wrapper,
    config=run_config,
    policy_tag_to_agent_id_map=\
    policy_tag_to_agent_id_map,
)
# Create and push obs, actions, rewards and
# done flags placeholders to the device.
create_and_push_data_placeholders(
    env_wrapper,
    policy_tag_to_agent_id_map,
    trainer
)
# Perform training.
trainer.train()
```

FIG. 7

900

Provide, from a CPU host to a GPU device, parameters of a simulation environment for a plurality of agents at simulation setup 902

Initialize, by a GPU device, a neural network stored at a GPU memory for a simulation 904

Generate, via the neural network, a thread that simulates at least one agent from the plurality of agent observing a state, receiving a reward and sampling an action according to a respective policy model corresponding to the at least one agent 906

Operate multiple threads in parallel by at least one processing block 908

Conducting, at one or more processing blocks of the GPU operated in parallel, the simulation of the plurality of agents 910

Store, at the GPU memory, simulation data from the multiple threads 912

Conduct PyTorch-based multi-agent training using roll-out data gathered from the simulation 914

Run block-parallelized environment  922

Conduct thread-parallelized multi-agent steps 924

Automatically reset environments 926

Sample thread-parallelized actions  928

Generate roll-out data from environments  930

SYSTEMS AND METHODS FOR END-TO-END MULTI-AGENT REINFORCEMENT LEARNING ON A GRAPHICS PROCESSING UNIT

TECHNICAL FIELD

The embodiments relate generally to machine learning systems and their hardware implementations, and more specifically to systems and methods for end-to-end multi-agent reinforcement learning on a graphics processing unit (GPU).

BACKGROUND

Reinforcement learning (RL) is a training framework to train artificial intelligent (AI) agents, such as a chatbot for interacting with human users to perform certain tasks, e.g., customer service, ticket booking, and/or the like. In some situations, a human user may interact with more than one AI agents, while the multiple AI agents may interact among themselves to exchange information in order to perform a complicated task. For example, in a multi-agent setting, a human user may interact with a first AI agent hosted by a healthcare provider to book a medical appointment, and with a second AI agent hosted by an insurance provider to obtain pre-approval of an upcoming treatment. The two AI agents may interact with each other to share information for decision making.

Training such multiple AI agents often entails RL experiments that simulate the behaviors of the AI agents having high-dimensional states, observation or action spaces. Thus, such simulations can take days or even weeks, especially with a large number of agents, because online RL-loop may need to repeatedly run the simulations, and the number of repetitions required can grow exponentially with the complexity of the learning problem. This phenomenon can be even more salient when RL agents are trained with zero or little initial knowledge about the simulation or task at hand.

Therefore, there is a need for an efficient RL simulation mechanism to train AI agents.

BRIEF DESCRIPTION OF THE DRAWINGS

FIG. 1 is a simplified block diagram illustrating a typical reinforcement learning loop for a single agent interacting with a simulation environment, according to one embodiment described herein.

FIG. 2 is a simplified block diagram illustrating a typical distributed reinforcement learning architecture, according to one embodiment described herein.

FIG. 5 is a simplified block diagram illustrating a pseudo-code segment of an example step function signature adopted by the Compute Unified Device Architecture (CUDA), according to one embodiment described herein.

FIG. 6 is a simplified diagram illustrating a pseudo-code segment for augmenting Python environment for the GPU-based end-to-end RL workflow mechanism, according to one embodiment described herein.

FIG. 7 is a simplified diagram illustrating a pseudo-code segment for providing quality-of-life tools to set up RL training pipeline for the GPU-based end-to-end RL workflow mechanism, according to one embodiment described herein.

FIG. 9A is a simplified logic flow diagram illustrating a method of implementing a reinforcement learning framework on a single GPU, according to some embodiments described herein.

Figure 3:
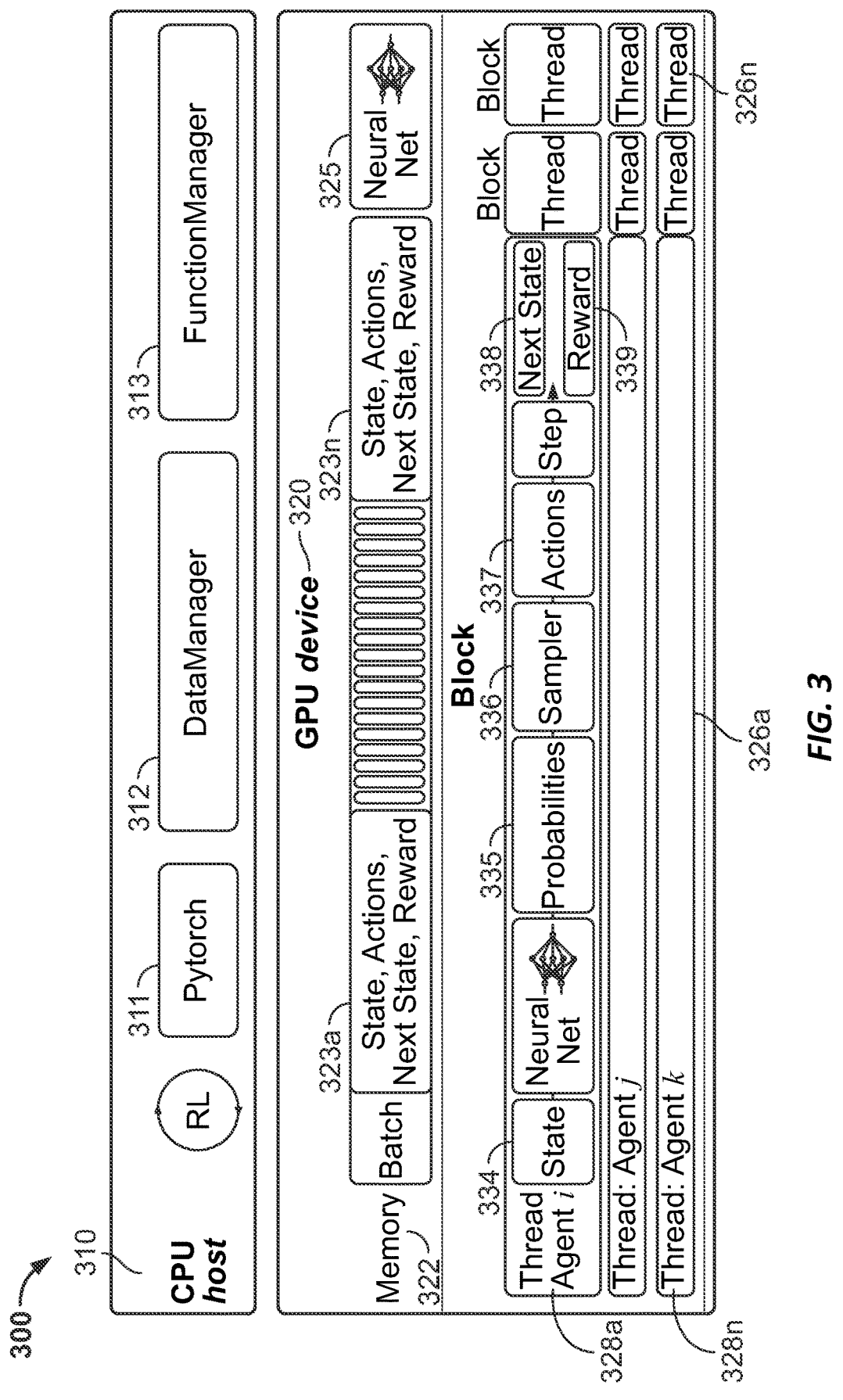
FIG. 3 is a simplified block diagram illustrating an overall layout of computational and data structures of a GPU-based end-to-end RL workflow mechanism, according to one embodiment described herein.

In the figures, elements having the same designations have the same or similar functions.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Existing reinforcement learning (RL) networks have limited applications in complex simulations that feature multiple agents or high-dimensional state, observation, or action spaces, because RL experiments can take days or even weeks, especially with a large number of agents. In particular, existing RL implementations typically combine CPU-based simulations with GPU neural network models. For example, RL simulations are performed on CPU(s) to generate RL rollouts by performing actions suggested from the neural network model residing on the GPU, while the neural network model is trained on GPU(s). As a result, a large amount of CPU-GPU data communication is required, which can be costly and inefficient. In addition, because CPU(s) often have limited capacity in handling massive computation in parallel (e.g., in a multi-agent setting), CPU-based simulations in a multi-agent setting can be slow.

Some recent systems may attempt to adopt functional programming to facilitate parallelization in the RL simulation to improve efficiency. However, multi-agent simulations often require processing complex multi-agent state representations (including mutable collections and hash tables) and graph-based or branch divergent logic to describe interactions between agents. Thus, it remains challenging to use functional programming to build efficient multi-agent simulations.

In view of the inefficiency in current RL implementations, embodiments provide a fast multi-agent RL pipeline that runs the full RL workflow end-to-end on a single GPU, using a single store of data for simulation roll-outs, inference, and training. Specifically, simulations and agents in each simulation are run in tandem, taking advantage of the parallel capabilities of the GPU. This way, the costly GPU-CPU communication and copying is significantly reduced, and simulation sampling and learning rates are in turn improved. In this way, a large number of simulations may be concurrently run on the GPU, thus largely improving efficiency of the RL training.

In one embodiment, the end-to-end GPU-based RL workflow distributes each agent to one dedicated GPU thread, which exclusively trains and executes one particular agent and its communication with other agents. In this way, even when the updating logics is complicated, the individual GPU thread is able to perform efficiently by mapping each individual GPU thread (the most basic GPU computing unit) to a specific individual agent. In addition, as a GPU is designed for parallel computing in the thread level, the GPU-based RL workflow is able to run a large number of agents in parallel among multi-agent efficiently.

In one embodiment, the end-to-end GPU-based RL workflow may be built on a Compute Unified Device Architecture (CUDA). CUDA is a platform and programming model that allows users to run programs (referred to as "kernels") on (CUDA-enabled) GPU hardware. The CUDA structure enables users to use the full feature set of CUDA programming, including the GPU's parallel computational elements, making it convenient to implement even complex multi-agent simulations. A gym-style API may be used to integrate CUDA C-based simulations through a light-weight environment wrapper that executes the step on the GPU. CUDA also provides a PyTorch-based trainer and training utilities that implement end-to-end RL training on the GPU. As such, users are allowed to create and extend custom RL pipelines that maximize the utility of GPUs through CUDA.

Overview

FIG. 1 is a simplified block diagram illustrating a typical reinforcement learning loop for a single agent interacting with a simulation environment, according to one embodiment described herein.

Reinforcement learning is often formalized as a Markov Decision Process (MDP) and extensions thereof. A Markov Game is a multi-agent extension of the MDP that formally describes a system of agents, indexed by i=1, . . . , N that interact with a (simulation) environment. The environment is further defined by a state space S, action space A, reward function r, environment dynamics $T(s_t, a_t)$, and a discount factor γ. Throughout this application, boldface quantities denote vectors over agents, e.g., $s=(s_1, . . . , s_N)$ over N agents. This process is shown for a single agent at framework 100 in FIG. 1.

During training, an AI agent 102 repeatedly observes a state 104 of the simulation environment 110, and then receives a reward 105 given the state. The agent 102 may then samples actions 103 using its policy model 106. For example, each RL agent uses a policy model 106 $\pi_i (a_i|s_i)$ to sample actions to execute. Given the actions 103, the dynamics T move the environment forward. For example, given the agent's action 103, the simulation environment 110 transitions to the next state, thus updating the state 104. A roll-out is a sequence of transitions $\xi=\{(s_t, a_t, r_t)\}_{t=0, . . .}$ , τ, representing the experience of the agents in the simulation. Given roll-outs, the goal of RL is to optimize the policy models 106 $\pi=(\pi_1, . . . , \pi_N)$, each aiming to maximize its discounted expected reward:

$$\pi_i^* = \arg E_{\pi,T} \left[ \sum_{t=0}^{T} \gamma^t r_{i,t} \right] \tag{1}$$

In this way, the learning structure 100 may generalize to multiple agents interacting with the simulation, each agent being part of the environment from the point of view of the other agents.

In some embodiments, the RL framework 100 may apply to a model-free, on-policy RL, meaning that the agents do not explicitly learn a parametric "world model" of T and use the policy $\pi_i$ for both exploration (collecting unseen experience) and exploitation (executing "optimal" behavior). This type of model-free RL may often require a significant amount of roll-out data, especially when applying RL to complex problems. As such, high-throughput RL systems with fast RL-loops are often desired.

FIG. 2 is a simplified block diagram illustrating a typical distributed reinforcement learning architecture 200, according to one embodiment described herein. Distributed computing has been traditionally used to accelerate and scale up RL systems. Distributed RL architectures, such as architecture 200, typically comprise a large number of roll-out workers 205a-n and trainer workers 202 operating in tandem. The roll-out workers 205a-n repeatedly step through the environment to generate roll-outs in parallel, using the actions sampled from the policy models on the roll-out workers or provided by the trained worker 202. The data 210 is transferred to the trainer worker 202 for performing policy optimization, and the updated model parameters or actions are transferred back to the roll-out workers 205a-n.

In this distributed structure 200, roll-out workers 205a-n typically use CPU machines, and sometimes, GPU machines for richer environments. Trainer workers 202 gather the roll-out data (asynchronously) from the roll-out workers 205a-n and optimize policies on CPU or GPU machines. Thus, the repeated data transfer 210 between the trainer worker 202 and the roll-out worker 205a-n may cause significant CPU-GPU communication overhead, e.g., experience from the roll-out workers 205a-n to the trainer worker 202, and model parameters or actions from the trainer worker 202 back to the roll-out workers 205a-n. In particular, when the environment's observation space is large and/or when the number of roll-out workers is large, the data transfer 210 can be costly.

In addition, roll-out workers 205a-n and trainer workers 202 often run different types of tasks with different compute requirements. This can lead to inefficient resource utilization. Calibrating the optimal ratio of worker and/or node types between roll-out workers and trainer workers can be tedious.

In particular, in multi-agent simulations, especially with a large number of agents, running the environment itself can become the bottleneck, as observations, rewards, and other information needs to be computed for multiple agents. The roll-out time for the roll-out workers 205a-n can often increase with increasing number of agents. Such complex simulations, e.g., with multiple agents, often need a lot of compute power, thus incurring heavy hardware requirements.

FIG. 3 is a simplified block diagram illustrating an overall layout of computational and data architecture 300 of a GPU-based end-to-end RL workflow mechanism, according to one embodiment described herein. In the architecture 300, the end-to-end RL workflow is executed on a single GPU 320.

The architecture 300 may include a CPU host 310 which is communicatively coupled to a GPU device 320. The CPU host 310 includes a Pytorch module 311, a data manager 312 and a function manager 313, which jointly provide initialization of the RL workflow such as initial states. The data manager 312 and the function manager 313 enable defining RL GPU-workflows in Python 311.

Specifically, a CUDA program may involve three main steps: (1) Host-to-device transfer (push): Copying input data from the host to device memory, e.g., at the start; (2) Invoke CUDA kernels (execute): Loading CUDA functions to run and caching data on the GPU for speed; (3) Device-to-host transfer (pull): copying data back from the device to host memory, e.g., once training finishes. Following this paradigm, the data manager 312 and the function manager 313 may provide two key Python classes (residing on the CPU) to facilitate all host-device communication and interactions that are relevant to RL. The data manager 312 handles all host-device data transfers (push and pull). The function manager 313 allows the user to invoke CUDA programs (or compute kernels) from the CPU 310 and execute them on the GPU 320. These Manager classes provide simple APIs to build high-level Python applications on the architecture 300.

The GPU device 320 includes a GPU memory 322 and one or more processing blocks 326a-n. The GPU memory 322 stores simulation data in batches, e.g., in the form of a plurality of state, actions, next state, reward at each time instance 323a-n. The GPU memory 322 further stores a neural network 325 that may serve as the basis for the policy model of the RL agent(s).

As a GPU can run a large number of computational threads in parallel, GPU computations are organized into processing blocks 326a-n. Each block, e.g., 326a, has multiple threads 328a-n. Multiple thread blocks 326a-n are organized into a grid structure. A CUDA kernel can access and define parallel computations for these threads. In this example simulation implementation, each processing block (e.g., 326a) runs a simulation environment, in which the multiple threads 328a-n simulate multiple agents in this environment. For example, blocks can access a shared GPU memory 322 that stores simulation data 323a-n and neural network policy models 325. In this way, each thread (e.g., 328a) may simulate an agent which observes the current state 334 of the environment from the memory, generates (via the policy model) probabilities 335 of actions, uses a sampler 336 to sample an action 337, and thus generates the next state 338 and the reward 339 from the state transition. The multiple threads 328a-n in the block 326a may be operated in parallel.

The architecture 300 runs the full end-to-end RL workflow on a single GPU 320, including roll-out generation and training. Simulation data is updated in-place to eliminate data communication. For example, there is only a one-time data transfer between the CPU host 310 and the GPU device 320 (after the first reset), and no required communication thereafter. During all the subsequent step and reset calls, the data arrays are stored exclusively on the GPU memory 322 and modified in-place. All the data on the GPU in accessed and modified in-place, so there is no data copying cost.

The architecture 300 maximally parallelizes the environments and agents. Because each agent only uses a single thread on the GPU 320, a large number of agents and/or environments may be simulated in parallel, making this paradigm tremendously parallelized and efficient. The user owns the precise scheduling of each thread and has granular control over how the multi-agent logic is expressed.

In addition, each processing block or thread stays modular and flexible to easily accommodate using new environments, models and training algorithms. Each part of the RL pipeline is separately testable, making it possible to create and extend custom RL pipelines. As further discussed in FIG. 4, imperative and stateful code are used to build complex multi-agent simulation logic with interacting agents on the architecture 300.

Figure 4:
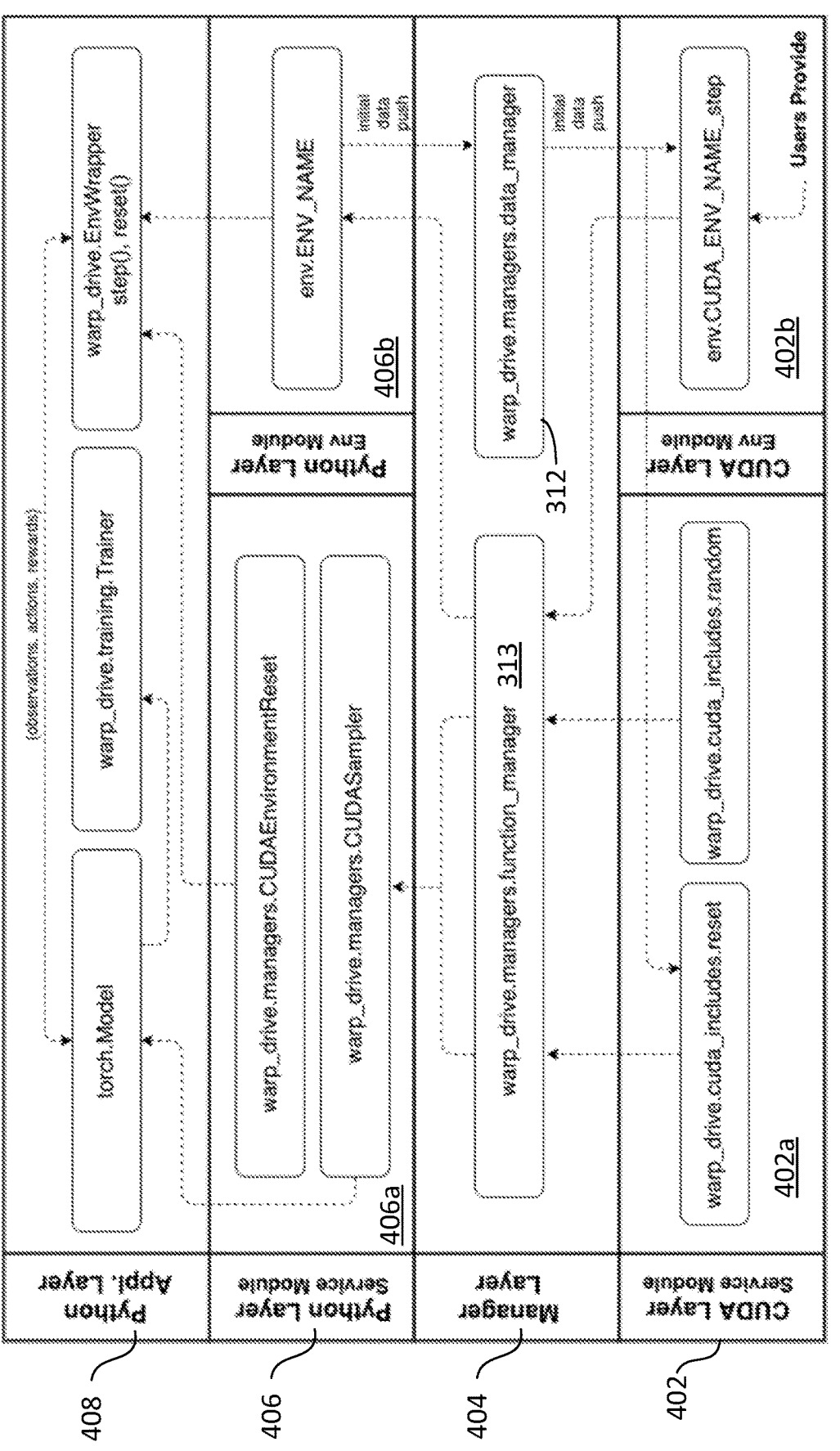
FIG. 4 is a simplified block diagram illustrating an example code structure diagram for executing on the hardware architecture of the GPU-based end-to-end RL workflow mechanism shown in FIG. 3, according to one embodiment described herein.

FIG. 4 is a simplified block diagram illustrating an example module structure diagram executed on the hardware architecture 300 of the GPU-based end-to-end RL workflow mechanism shown in FIG. 3, according to one embodiment described herein. The module structure diagram of the GPU-based end-to-end RL framework includes four layers, the CUDA layer 402, the manager layer 404, the Python service layer 406 and the application layer 408.

The CUDA layer 402 executes the CUDA kernel for RL step and reset. To execute this design, two CUDA modules, the CUDA service module 402a and the CUDA environment module 402b are included. The CUDA Service module 402a contains the CUDA C kernel version of the environment reset to reset individual environment replicas at the block level, and the kernel of sampler to sample actions at the thread level where each thread is handling one agent. This is the shared library for any environment. The CUDA Environment module 402b has the CUDA C kernel of the environment step and is separate from other CUDA services. Several default environments and the environment loader are provided to load custom environments provided by the user.

The manager layer 404 provides the data manager 312 and the function manager 313 to communicate with the CUDA layer 402. Using these managers, Python classes in the Python layer 406 can be provided to host and manage the corresponding CUDA back-end and support the high-level applications in the application layer 408.

The Python Layer 406 provides Python classes serving as fundamental classes for the Python applications running in the code structure, and communicate directly with the CUDA kernels. In particular, there are two major modules: the Python Service module 406a contains the Sampler class that directly controls the CUDA sampler kernel to sample agent actions at the thread level and maintains the action-data on the GPU. It also provides the EnvironmentReset class that controls the CUDA reset kernel to reset each individual environment replica in-place and independently. The Python Environment module 406b provides the Environment class to control the CUDA step kernel.

The Application Layer 408 supports a gym-style interface and provides pre-built RL modules and training utilities. Several tools are provided to simplify developing and running simulations on a GPU. For example, a light-weight wrapper class EnvWrapper that works with the Python Service and Environment modules 406a-b are provide to automatically build gym-style environment objects and run them on the GPU. For another example, a Trainer class, training utilities, and example scripts that enable end-to-end RL on a GPU are provided in a few lines of code and easy customization of the process.

FIG. 5 is a simplified block diagram illustrating a pseudo-code segment 500 of an example step function signature adopted by the Compute Unified Device Architecture (CUDA), according to one embodiment described herein. The modular structure shown in FIG. 4 makes it possible to integrate custom Python RL environments and develop an equivalent CUDA C implementation that can run on a GPU. For example, At the core, code segment 500 shows the sample function signature for simulations that are implemented using CUDA C. Code segment 500 shows the arguments to the step function including pointers to data arrays as well as the imperative observations, sampled actions, rewards and "done" flags that are manipulated in-place. For maximal parallelization, each GPU thread updates only the array-slices that correspond with its environment and agent.

To ensure correctness of CUDA C simulations, an effective approach is to implement the simulation logic in Python and NumPy first and verify its logical correctness. One can then implement the same logic and required data structures in CUDA C, and check whether the Python and CUDA C implementations yield similar results. To facilitate this process, an EnvironmentCPUvsGPU class is provided to test consistency between Python and CUDA C implementations of the same step logic, i.e., whether the observations, actions, rewards and the "done" flags are the same at each step.

FIG. 6 is a simplified diagram illustrating a pseudo-code segment 600 for augmenting Python environment for the GPU-based end-to-end RL workflow mechanism, according to one embodiment described herein. Assuming the Python and CUDA C step functions are consistent, an augmented environment object that uses the CUDA C step may be created. First, the Python Env class should be extended with a get data dictionary( ) method that defines which data should reside on the GPU. For example, code segment 600 shows a get data dictionary( ) method that returns a dictionary-like DataFeed object with data arrays and parameters that should be pushed to the GPU. Second, the step-function should call the CUDA step with the data arrays that the CUDA C step function should have access to. Given these additions, the EnvironmentWrapper class will automatically build an augmented Environment object that handles the low-level data transfer flow. This includes pushing all the data to the GPU after the very first reset, and providing gym-style step and reset Python methods for running the simulation on the GPU. Using this augmented environment enables RL on a GPU in a few lines of code, as shown in FIG. 7.

FIG. 7 is a simplified diagram illustrating a pseudo-code segment 700 for providing quality-of-life tools to set up RL training pipeline for the GPU-based end-to-end RL workflow mechanism, according to one embodiment described herein. Code segment 700 shows the EnvWrapper, and Trainer classes, and utility functions to simplify building fast and flexible RL workflows.

Computer Environment

Figure 8:
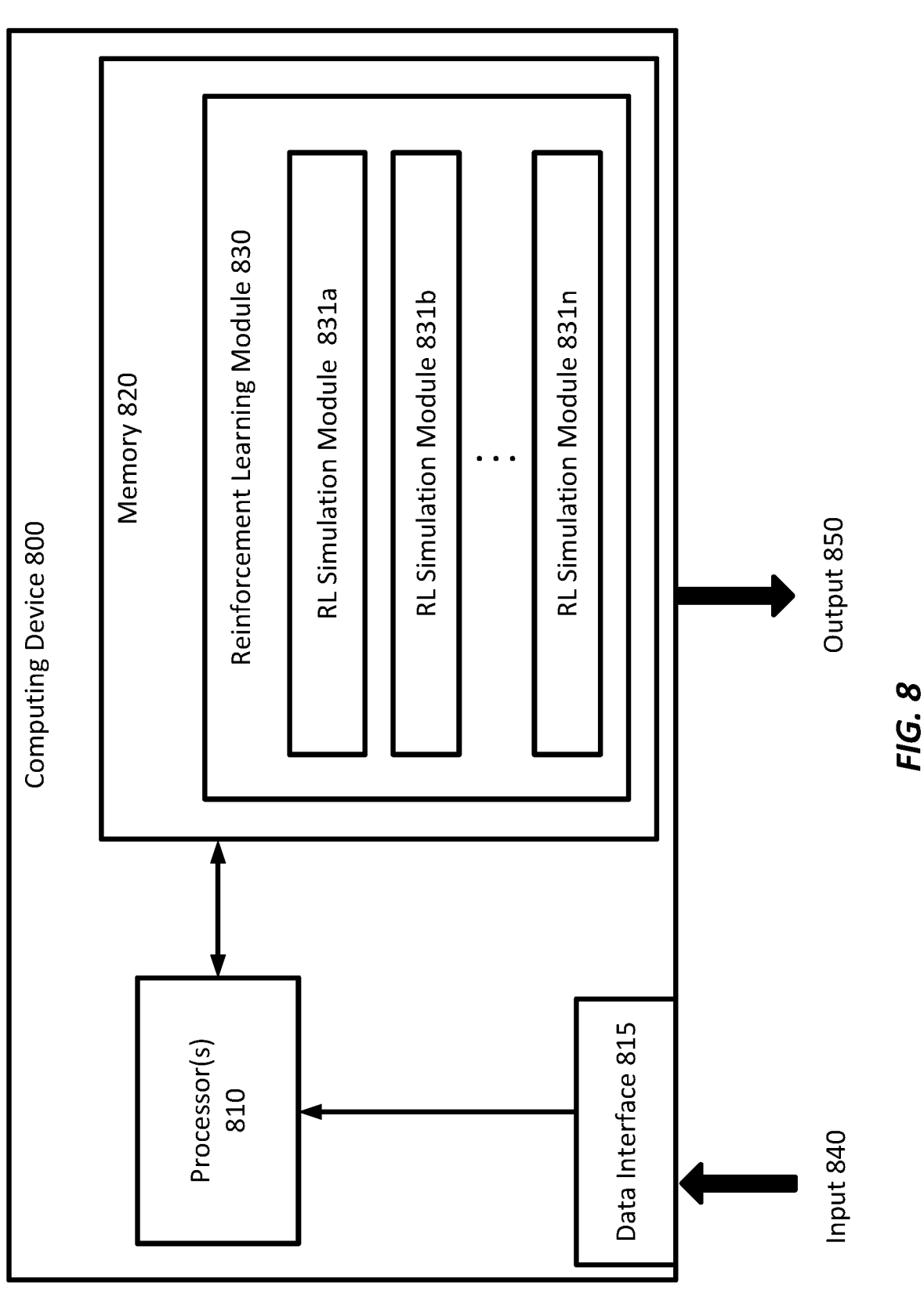
FIG. 8 is a simplified block diagram illustrating a computing device for implementing embodiments of the GPU-based end-to-end RL workflow mechanism, according to some embodiments described herein.

FIG. 8 is a simplified block diagram illustrating a computing device for implementing embodiments of the GPU-based end-to-end RL workflow mechanism, according to some embodiments described herein. As shown in FIG. 8, computing device 800 includes a processor 810 coupled to memory 820. Operation of computing device 800 is controlled by processor 810. And although computing device 800 is shown with only one processor 810, it is understood that processor 810 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 800. Computing device 800 may be implemented as a stand-alone subsystem, as a board added to a computing device, and/or as a virtual machine. For example, the processor(s) 810 may include the CPU host 310 and/or the GPU 320 shown in FIG. 3.

Memory 820 may be used to store software executed by computing device 800 and/or one or more data structures used during operation of computing device 800. Memory 820 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 810 and/or memory 820 may be arranged in any suitable physical arrangement. In some embodiments, processor 810 and/or memory 820 may be implemented on a same board, in a same package (e.g., system-in-package), on a same chip (e.g., system-on-chip), and/or the like. In some embodiments, processor 810 and/or memory 820 may include distributed, virtualized, and/or containerized computing resources. Consistent with such embodiments, processor 810 and/or memory 820 may be located in one or more data centers and/or cloud computing facilities. For example, processor 810 may correspond to the CPU host 310 in FIG. 3, and memory 820 may correspond to the GPU memory 322 in FIG. 3.

In some examples, memory 820 may include non-transitory, tangible, machine readable media that includes executable code that when run by one or more processors (e.g., processor 810) may cause the one or more processors to perform the methods described in further detail herein. For example, as shown, memory 820 includes instructions for a reinforcement learning module 830 that may be used to implement and/or emulate the systems and models, and/or to implement any of the methods described further herein. In some examples, the reinforcement learning module 830, may receive an input 840, e.g., such as various initialization data of simulation, via a data interface 815.

The data interface 815 may be any of a user interface that receives a user input, or a communication interface that may receive or retrieve a previously stored training dataset from the database. The reinforcement learning module 830 may generate an output 850, such as an action to a simulated environment.

In some embodiments, the reinforcement learning module 830 may further include a plurality of RL simulation modules 831*a-n* which are operated in parallel. The plurality of RL simulation modules 831*a-n* may corresponds to the processing blocks 326*a-n* in FIG. 3.

In some implementations, the reinforcement learning module 830 and its submodules 831*a-n* may be implemented via hardware, software and/or a combination thereof.

Example Workflow

FIG. 9A is a simplified logic flow diagram illustrating a method of implementing a reinforcement learning framework on a single GPU, according to some embodiments described herein. One or more of the processes of method 900 may be implemented, at least in part, in the form of executable code stored on non-transitory, tangible, machine-readable media that when run by one or more processors may cause the one or more processors to perform one or more of the processes. In some embodiments, method 900 corresponds to the operation of the reinforcement learning module 830 (FIG. 8) to implement a reinforcement learning framework in a multi-agent setting.

At step 902, the CPU host (e.g., 310 in FIG. 3) provides to the GPU device (e.g., 320 in FIG. 3) parameters of a simulation environment for a plurality of agents at a beginning of a simulation. For example, the CPU-GPU data transfer may be implemented through a one-time data copy. All the data from the CPU host 310 to the GPU device 320 is only copied once after the environment object is initialized and reset. The data manager 312 provides API methods to perform this push operation. The data copied from the CPU host 310 to the GPU device 320 may include environment configuration parameters, data arrays created at the end of the very first reset, placeholders for the observations, actions, rewards and "done" flags. The data manager 312 also helps maintain a copy of the variables that need to be re-initialized at every reset. After the initial data CPU-GPU transfer, there is no further data push from the CPU host 310 to the GPU device 320.

At step 904, the GPU device may initialize a neural network stored at a GPU memory for a simulation. For example, GPU Kernels may be called from the CPU. The function manager 313 provides API methods to initialize and invoke the CUDA C kernel functions required for performing the environment step, generating observations, and computing rewards from the host node. These functions execute only on the GPU device 320, and all the data arrays are modified in-place. Data may be pulled by the CPU host 310 from time to time for visualization or analysis purposes, but all the data can essentially reside on the GPU 320 only during training.

At step 906, the GPU generates, via the neural network, a thread that simulates at least one agent from the plurality of agent observing a state, receiving a reward and sampling an action according to a respective policy model corresponding to the at least one agent. At step 908, multiple threads may be conducted in parallel by at least one processing block at the GPU. At step 910, the simulation of the plurality of agents is conducted at one or more processing blocks of the GPU operated in parallel. It is noted that steps 906-910 are for illustrative purpose only; these steps may be performed concurrently, sequentially or in any other order. Specifically, details of steps 906-910 are further discussed in relation to FIG. 9B.

At step 912, the GPU memory (e.g., 322 in FIG. 3) may store simulation data from the multiple threads.

At step 914, PyTorch-based multi-agent training may be conducted using roll-out data gathered from the simulation. Once rollout data is gathered from several environments and agents into a training data batch, end-to-end training may be performed. For example, the Trainer builds on PyTorch 311 and calls all CUDA kernels and PyTorch operations (that run on the GPU device 320) from the CPU host. However, PyTorch can directly access and interpret the data batches (states, actions, rewards and done flags) stored in the GPU memory 322 as a Torch.Tensor. This allows the user to compute losses and modify the model parameters, while eliminating data copying. Given the modular design, existing implementations of other RL algorithms and model classes can be implemented on the GPU device 320 as well.

Figure 9B:
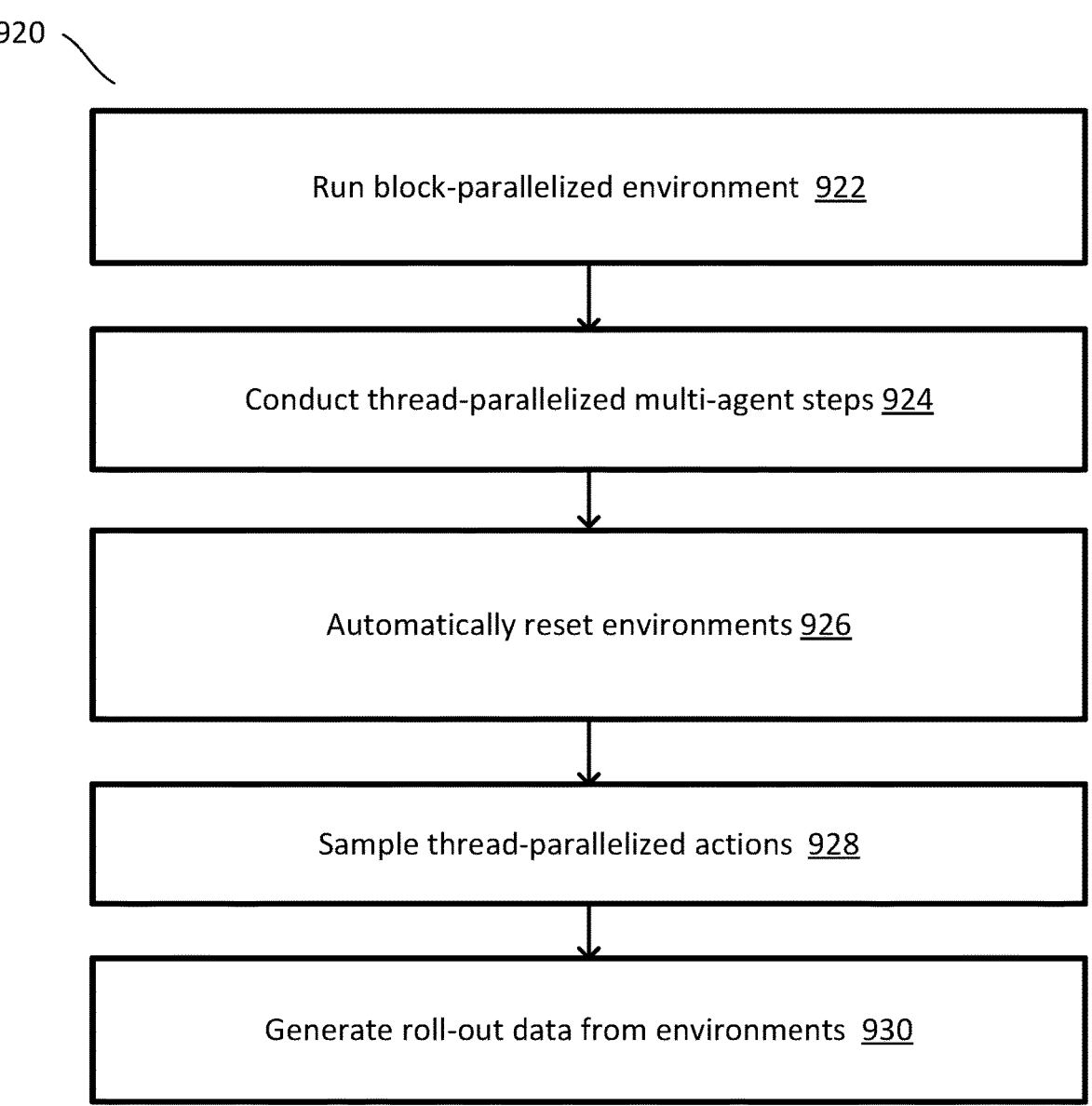
FIG. 9B is a simplified logic flow diagram illustrating a method of running parallelized simulation threads on a single GPU, according to some embodiments described herein.

FIG. 9B is a simplified logic flow diagram illustrating a method of running parallelized simulation threads on a single GPU, according to some embodiments described herein. One or more of the processes of method 920 may be implemented, at least in part, in the form of executable code stored on non-transitory, tangible, machine-readable media that when run by one or more processors may cause the one or more processors to perform one or more of the processes. In some embodiments, method 900 corresponds to the operation of the reinforcement learning module 830 (FIG. 8) to implement a reinforcement learning framework in a multi-agent setting.

At step 922, block-parallelized Environment Runs. For example, within the GPU device 3120, several replicas of the environment are executed in parallel. Each environment runs on a separate thread block. Because a typical GPU has thousands of blocks, a large number of environments can be run in parallel on just a single GPU.

At step 924, thread-parallelized multi-agent steps may be conducted. For example, within each environment (running in its own block), each agent in the environment can also execute its own logic on an agent-exclusive thread. As shown in FIG. 3, agents i, j and k operate in parallel on individual threads i, j and k, respectively. This becomes useful in the context of multi-agent RL, since the agents' operations during the environment step can be fully parallelized, thus the simulation time complexity remains constant even as the number of agents increases (up to the number of available threads).

At step 926, the GPU may automatically reset environments. For example, any environment may reach a terminal state and be "done". An EnvironmentReset class is designed to automatically identify and reset those environments that are done. At this point, those environments are also reset and given (new) initial data. For example, they may use the initial data arrays that were copied over at the initial reset.

At step 928, thread-parallelized actions may be sampled. For example, a Sampler class is provided for sampling actions in order to step through the environment. Actions are sampled using the probabilities computed by the policy models. The sampler runs in parallel on each agent thread, and runs about four times faster than equivalent PyTorch implementation.

At step 930, roll-out data may be generated for the simulated environments. For example, the roll-out data, collecting the states, rewards, actions, may be stored at the GPU memory 322 for training the policy model running on the neural network 325.

Some examples of computing devices, such as computing device 800 may include non-transitory, tangible, machine readable media that include executable code that when run by one or more processors (e.g., processor 810) may cause the one or more processors to perform the processes of methods 900 and 920. Some common forms of machine readable media that may include the processes of methods 900 and 920 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Example Performance

Figure 10:
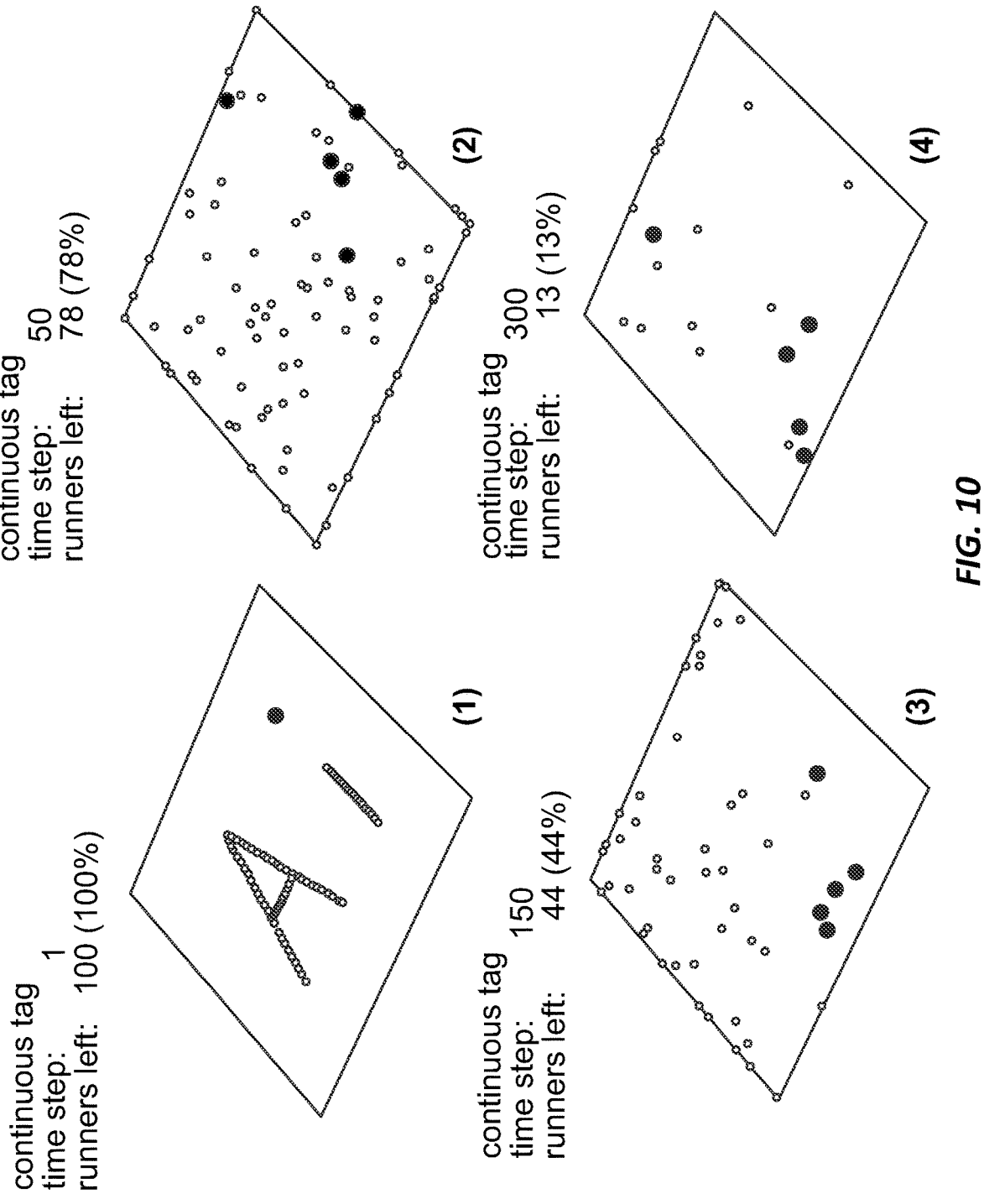
FIG. 10 is an example performance illustration of a simulated tag environment using the GPU-based end-to-end RL workflow mechanism, according to some embodiments described herein.

FIG. 10 is an example performance illustration of a simulated tag environment using the GPU-based end-to-end RL workflow mechanism, according to some embodiments described herein. In a tag environment, $N_{tag} \geq 1$ taggers work together to catch $N_{run} \geq 1$ runners. There are $N=N_{tag}+N_{run}$ agents in total. Runners are tagged once a tagger gets close enough. Each simulation episode ends after the maximum time steps, or when all runners have been tagged. The percentage of runners that were tagged defines how successful the taggers were. The goal for each agent is to learn how to optimally accelerate (or brake) and turn around on the 2-D playing field. Taggers and runners can have different skill levels: the higher the skill, the higher the maximal speed. A discrete (simple) and continuous (advanced) version of Tag are used. In discrete Tag, agents move on a discrete 2-D grid. Every agent can choose to move up, down, left, right by one cell, or to not move. In continuous Tag, agents move in a continuous 2-D world. Here, every agent can accelerate, brake and/or turn around, still via a discrete set of actions, and the agents' movements follow classical mechanics.

For benchmarking, two semantic variations are used, where agents have partial or full observations. With partial observations, agents can only see the closest K agents. RL can optimize the tagger and runner policies. Here, taggers are positively rewarded (e.g., +1) for each successful tag, so they are incentivized to tag the runners. Once a runner is tagged, it receives a penalty (e.g., +1) and leaves the game. Therefore, runners learn to avoid being tagged. Tag can become a complicated decision-making problem once agents are strategic (e.g., trained by RL) and as more and more taggers and runners participate. For instance, taggers may learn cooperative strategies, e.g., taggers might learn to encircle runners.

FIG. 10 shows a sequence of snapshots shows continuous Tag with 5 taggers (big circles) and 100 runners (small circles) on a 20×20 grid. Snapshots are taken at 1) the start of the episode, 2) step 50, 3) step 150, and 4) step 300. At the start, the agents are arranged in the shape of the letters "Ai". Only 13% runners remain after 300 steps. Discrete Tag looks visually similar.

Figure 11:
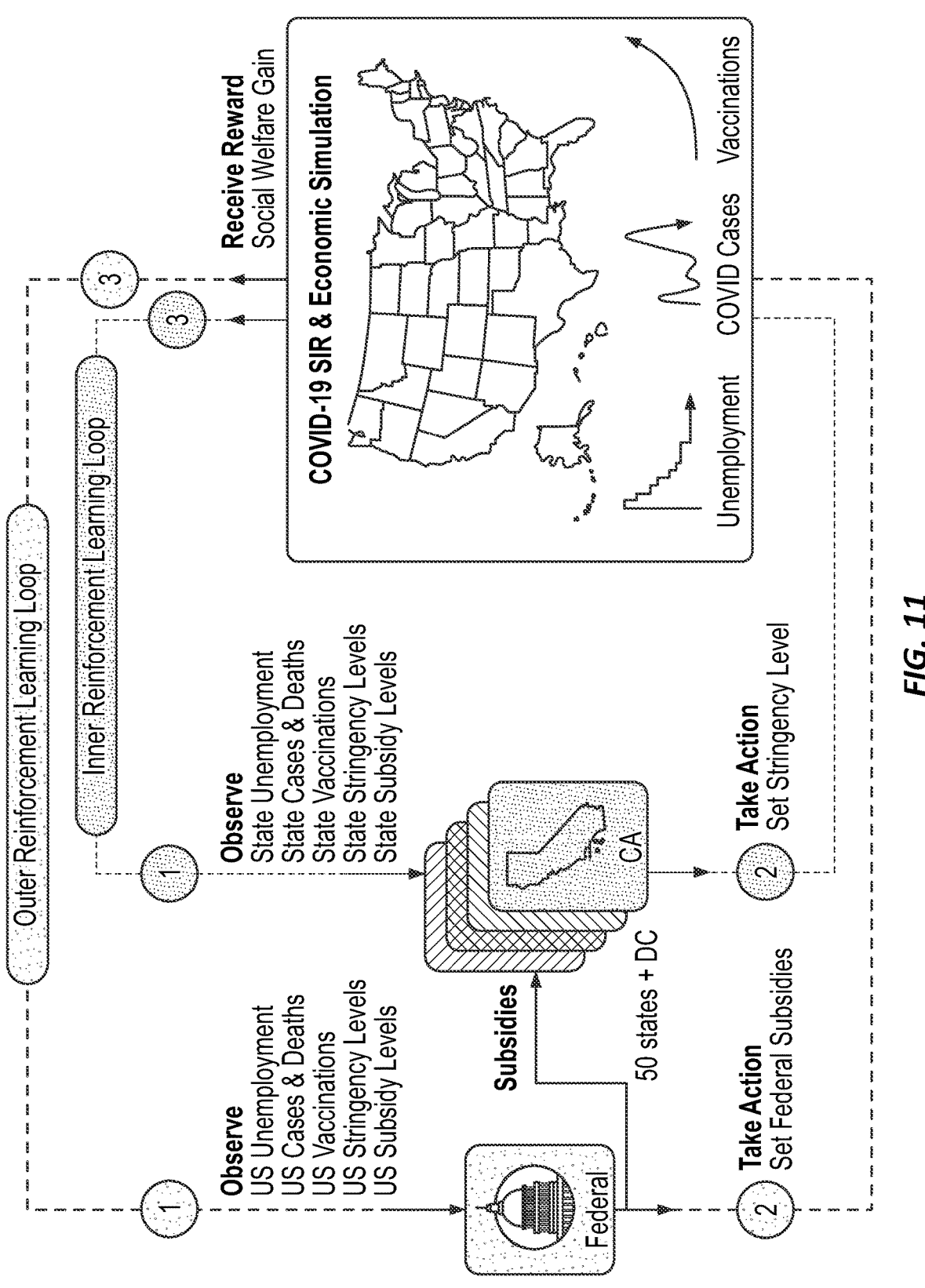
FIG. 11 is an example performance illustration of COVID-19 economic simulation using the GPU-based end-to-end RL workflow mechanism, according to some embodiments described herein.

FIG. 11 is an example structure illustration of COVID-19 economic simulation using the GPU-based end-to-end RL workflow mechanism, according to some embodiments described herein. The COVID-19 simulation models health and economic dynamics amidst the COVID-19 pandemic, based on real-world data. The simulation step is substantially more complex compared to Tag environment shown in FIG. 10 and so takes a larger fraction of each iteration's run-time. The simulation comprises 52 agents: 51 governors corresponding to each US state and Washington D.C., and another one for the (USA) federal government. This is a complicated two-level multi-agent environment where the US state agents decide the stringency level of the policy response to the pandemic, while the US federal government provides subsidies to eligible individuals. Actions taken by each agent affect its health and economic outcomes, such as deaths, unemployment, and GDP. In addition, the actions of the federal government can change the health-economic trade-off and optimization objective for the US states, making it a complex, unstable two-level RL problem.

FIGS. 12-16 are data performance charts illustrating various performance attributes of the GPU-based end-to-end RL workflow mechanism simulating the tag environment in FIG. 10 and the COVID-19 environment in FIG. 11, according to some embodiments described herein. Performance is compared across agents, across environment replicas, and between a 16-CPU N1 node (on GCP) and the proposed GPU-based end-to-end RL workflow on an Nvidia A100 GPU. All benchmarks results average over 5 repetitions.

Figure 12:
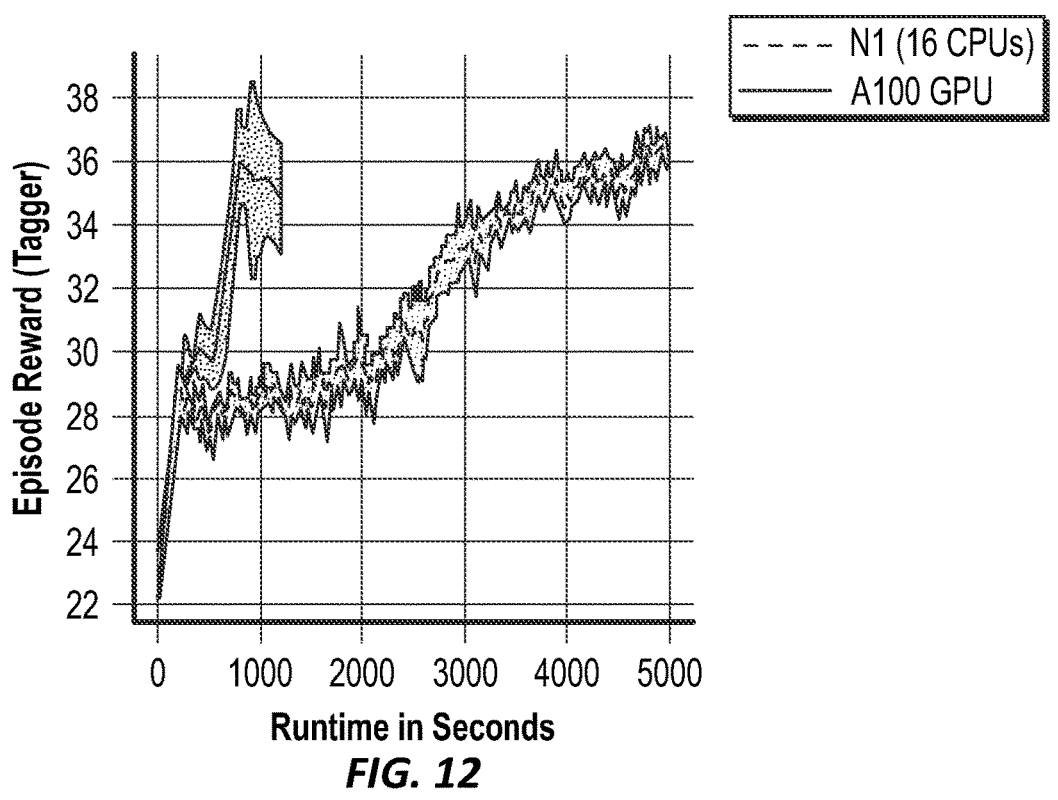
FIGS. 12-16 are data performance charts illustrating various performance attributes of the GPU-based end-to-end RL workflow mechanism, according to some embodiments described herein.

FIG. 12 compares the episode reward vs wall-clock time, continuous Tag, 12 agents. Overall, the proposed GPU-based RL achieves very fast end-to-end RL training speeds. With 2000 discrete Tag environments and 5 agents for each environment, GPU-based RL achieves 1.3 million end-to-end RL training iterations per second. With 2000 environments and 1000 agents, it yields 0.58 million training iterations per second. When increasing the number of agents by 200 times, from 5 to 1000, resulted in only 50% lower throughput. In continuous Tag, with 2000 environments and 5 agents, the GPU-based RL achieves 0.57 million training iterations per second, or 0.15 million training iterations per second with 45 agents.

FIG. 12 shows the training speed between an N1 16-CPU node and a single A100 GPU in continuous Tag with 10 runners and 2 taggers, both using 60 environment replicas. With the same environment and training parameters, the single GPU method is 5 times faster, even with just 12 agents.

Figure 13:
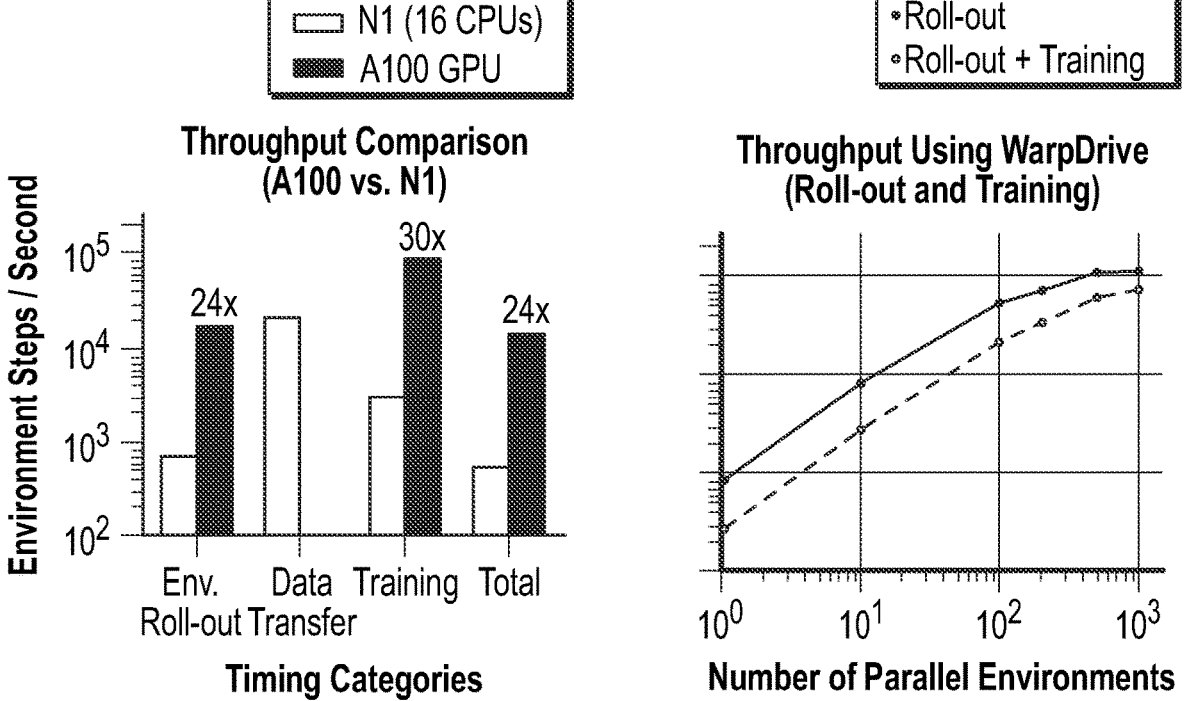

FIG. 13 shows the performance of GPU-based RL in the COVID-19 economic simulation. The GPU-based RL achieves 24 times more steps per second with 60 environment replicas, compared to a 16 CPU node. Across different timing categories, the performance gains comprise a 24 times speed-up during the environment roll-out, a zero data transfer time, and a 30 times speed-up for training the policy models. Moreover, the GPU-based RL can scale almost linearly to 1000 parallel COVID-19 environments, resulting in even higher throughput gains.

Figures 14, 15, 16:
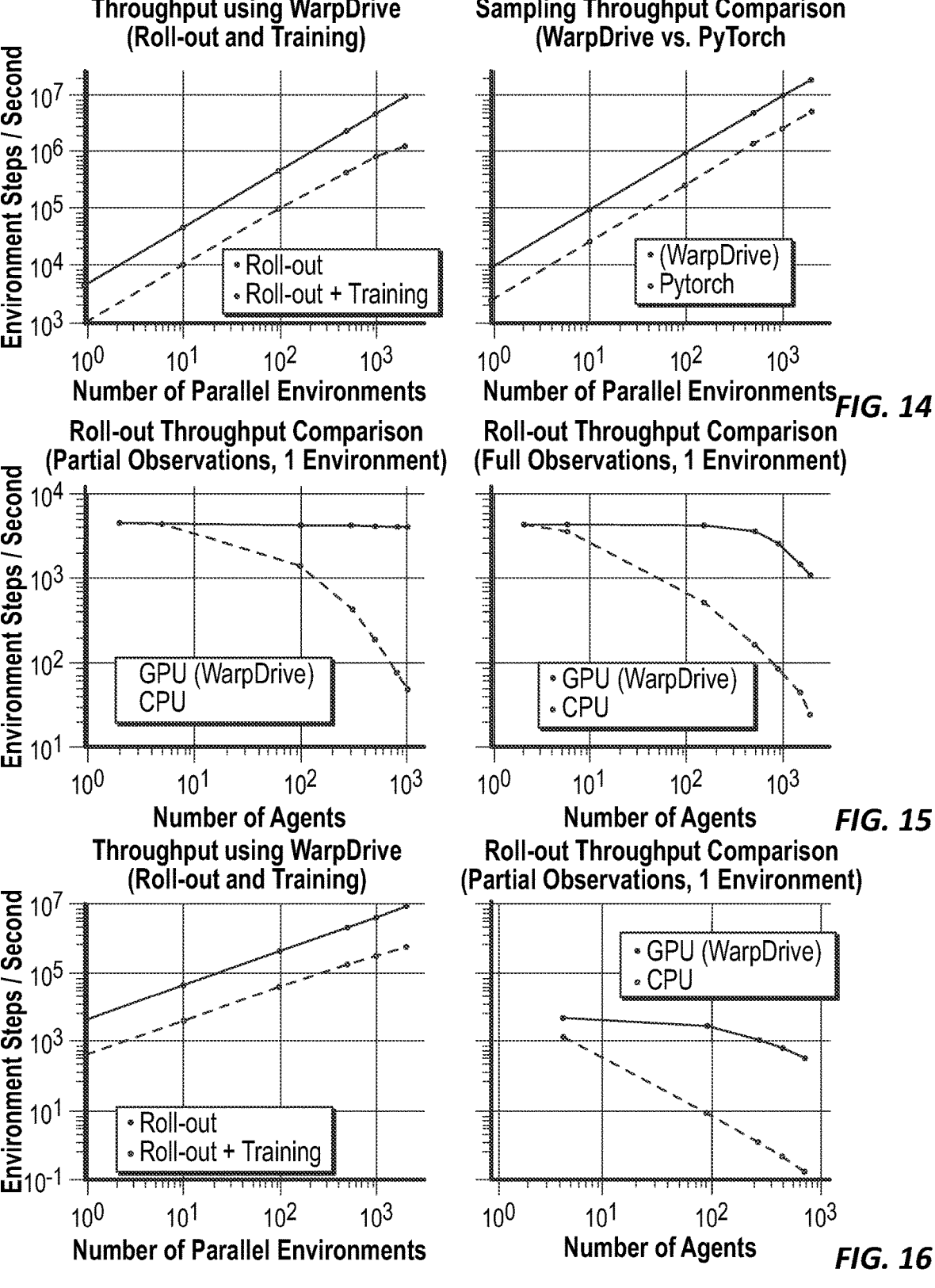

FIG. 14 shows the roll-out, training, and sampling throughput in discrete Tag with increasing number of environments with 5 agents. The GPU-based RL scales linearly to over thousands of environments (fixed number of agents) and yields almost perfect parallelism over environments. For example, the GPU-based RL runs at 9.8 million environment steps per second with 5 agents and 2000 discrete Tag environments. With 1000 agents, it achieves 2.9 million environment steps per second.

FIG. 15 shows performance per discrete Tag environment as the number of agents grows. For each environment replica, the GPU-based RL is at least 50 times faster compared to a NumPy version on a single CPU, for up to 1000 agents.

FIG. 16 shows the GPU-based RL performance in continuous tag. The throughput scales linearly to over thousands of environment replicas in continuous Tag. In particular, the GPU-based RL reaches 8.3 million environment steps per second with 5 agents and 2000 environments. For each replica, the GPU-based RL yields at least 500 times more environment steps per second compared to a single CPU, for up to 820 agents.

The improved performance of the GPU-based RL sampler contributes to overall faster training. In discrete Tag, GPU-based RL samples 18 million actions per second per agent with 2000 environments, independent of the number of agents. This is 3:6 times faster compared to the equivalent PyTorch operator, which yields 5 million samples per second. In continuous Tag, GPU-based RL samples 16 million actions per action category per second per agent with 2000 environments, independent of the number of agents.

The complexity of the simulation logic, as implemented in the step and reset function, impacts performance. To quantify the impact of this aspect, we compared two variations of Tag: with agents using partial observation vectors or full observation vectors. When using partial observations, each agent can only see its K nearest neighbors. In discrete Tag, using partial observations yields an environment step function with close to O(N) time complexity, better than O(N2). More generally, using partial observations can enable better scaling behavior when using GPUs. Constructing partial observations for any agent may require less information about and communication between (other) agent threads, and thus benefits more from parallelizing across agents. However, this depends on the specific implementation of each simulation and is an important design choice. It is observed from FIGS. 9-16 that the speed gains persist under the more complex COVID-19 economic simulation.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A graphics processing unit (GPU) based system for implementing multiple reinforcement learning (RL) agents, the GPU based system comprising:
a central processing unit (CPU) host that:
provides, to a GPU device, parameters of a simulation environment involving a plurality of RL agents during a one-time CPU-GPU data transfer at a simulation setup; and
the GPU device communicatively coupled to the CPU host, comprising:
a GPU memory storing a neural network model supporting the plurality of RL agents and a set of simulation roll-out data generated by the plurality of RL agents; and
one or more processing blocks to operate the plurality of RL agents in parallel, generating the set of simulation roll-out data,
wherein each processing block of the one or more processing blocks implements the simulation environment and operates multiple threads in parallel, and
wherein each thread of the multiple threads conducts, via the neural network model stored in the GPU memory, at least one RL agent from the plurality of RL agents to generate at least part of the set of simulation roll-out data by observing a state of the simulation environment including other RL agents, receiving a reward and sampling an action according to a respective policy model corresponding to the at least one RL agent, wherein the set of simulation roll-out data is directly stored, upon generation, at the GPU memory without data copying between the CPU host and the GPU device.

2. The system of claim 1, wherein the CPU host transfers data to the GPU device for one time only.

3. The system of claim 2, wherein the transferred data includes any combination of:
configuration parameters of the simulation environment;
data arrays for reset; and
initial values for observations, actions, and rewards for reinforcement learning.

4. The system of claim 2, wherein the CPU host comprises a data manager that provides an application programming interface (API) to conduct data transfer between the CPU host and the GPU device.

5. The system of claim 1, wherein the CPU host comprises a function manager that provides an API to invoke a GPU kernel at the GPU device.

6. The system of claim 1, wherein each of the one or more processing blocks executes a replica of the simulation environment in a multi-agent setting.

7. The system of claim 1, wherein data arrays generated from the one or more processing blocks during simulation are stored at the GPU memory without transferring the data arrays to the CPU host.

8. The system of claim 1, wherein for the at least one thread, the respective policy model outputs probabilities in response to an input of the observed state, and the action is sampled based on the output probabilities.

9. The system of claim 1, wherein the roll-out data from the plurality of RL agents and replicas of the simulation environments running on the one or more processing blocks are gathered into a training data batch stored at the GPU memory, and
wherein the training data batch is used for training policy models by the neural network model.

10. A method for implementing multiple reinforcement learning (RL) agents on a graphics processing unit (GPU) system, the method comprising:
providing, from a central processing unit (CPU) host to a GPU device communicatively coupled to the CPU host, parameters of a simulation environment involving a plurality of RL agents during a one-time CPU-GPU data transfer at a beginning of a simulation,
initializing, by the GPU device, a neural network model stored at a GPU memory to support the plurality of RL agents for the simulation, wherein the GPU memory stores a set of simulation roll-out data generated by the plurality of RL agents;
conducting, at one or more processing blocks of the GPU operated in parallel, wherein at least one processing block of the one or more processing blocks implements the simulation environment and operates multiple threads in parallel, the simulation of the plurality of RL agents including:
generating, via the neural network model, a thread that conducts at least one RL agent from the plurality of RL agent to generate at least part of the set of simulation roll-out data by observing a state of the simulation environment including other RL agents, receiving a reward and sampling an action according to a respective policy model corresponding to the at least one RL agent, wherein the set of simulation roll-out data is directly stored, upon generation, at the GPU memory without data copying between the CPU host and the GPU device, operating each of the multiple threads by at least one processing block to conduct at least one RL agent from the plurality of RL agents, and storing, at the GPU memory, simulation data from the multiple threads; and gathering roll-out data from the simulation for training policy models on the neural network model.

11. The method of claim 10, wherein the CPU host transfers data to the GPU device for one time only.

12. The method of claim 11, wherein the transferred data includes any combination of:

configuration parameters of the simulation environment;

data arrays for reset;

initial values for observations, actions, and rewards for reinforcement learning.

13. The method of claim 11, wherein the CPU host comprises a data manager that provides an application programming interface (API) to conduct data transfer from the CPU host to the GPU device.

14. The method of claim 10, wherein the initializing is performed at a function manager in the CPU host that provides an API to invoke a GPU kernel at the GPU device.

15. The method of claim 10, wherein each of the one or more processing blocks executes a replica of the simulation environment in a multi-agent setting.

16. The method of claim 10, wherein data arrays generated from the one or more processing blocks during simulation are stored at the GPU memory without transferring the data arrays to the CPU host.

17. The system of claim 10, wherein for the at least one thread, the respective policy model outputs probabilities in response to an input of the observed state, and the action is sampled based on the output probabilities.

18. A non-transitory processor-readable medium storing a plurality of processor-executable instructions for implementing multiple reinforcement learning (RL) agents on a graphics processing unit (GPU) system, the instructions being executed by one or more processors to perform operations comprising:

providing, from a central processing unit (CPU) host to a GPU device communicatively coupled to the CPU host, parameters of a simulation environment involving a plurality of RL agents during a one-time CPU-GPU data transfer at a beginning of a simulation, initializing, by the GPU device, a neural network model stored at a GPU memory to support the plurality of RL agents for the simulation, wherein the GPU memory stores a set of simulation roll-out data generated by the plurality of RL agents;

conducting, at one or more processing blocks of the GPU operated in parallel, wherein at least one processing block of the one or more processing blocks implements the simulation environment and operates multiple threads in parallel, the simulation of the plurality of RL agents including:

generating, via the neural network model, a thread that conducts at least one RL agent from the plurality of RL agent to generate at least part of the set of simulation roll-out data by observing a state of the simulation environment including other RL agents, receiving a reward and sampling an action according to a respective policy model corresponding to the at least one RL agent, wherein the set of simulation roll-out data is directly stored, upon generation, at the GPU memory without data copying between the CPU host and the GPU device, operating each of the multiple threads by at least one processing block to conduct at least one RL agent from the plurality of RL agents, and storing, at the GPU memory, simulation data from the multiple threads; and gathering roll-out data from the simulation for training policy models on the neural network model.

19. The non-transitory processor-readable medium of claim 18, wherein the CPU host transfers data to the GPU device for one time only.

20. The non-transitory processor-readable medium of claim 18, wherein data arrays generated from the one or more processing blocks during simulation are stored at the GPU memory without transferring the data arrays to the CPU host.

* * * * *